(12) United States Patent
Noh

(10) Patent No.: US 8,017,284 B2
(45) Date of Patent: Sep. 13, 2011

(54) ELECTRODE FOR A FUEL CELL, AND A MEMBRANE-ELECTRODE ASSEMBLY AND FUEL CELL SYSTEM COMPRISING THE SAME

(75) Inventor: Hyung-Gon Noh, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 809 days.

(21) Appl. No.: 11/221,999

(22) Filed: Sep. 7, 2005

(65) Prior Publication Data

US 2007/0231673 A1    Oct. 4, 2007

(30) Foreign Application Priority Data

Sep. 8, 2004   (KR) .................. 10-2004-0071669

(51) Int. Cl.
  *H01M 2/14* (2006.01)
  *H01M 8/04* (2006.01)
  *H01M 4/90* (2006.01)
(52) U.S. Cl. ........ 429/532; 429/516; 429/523; 429/483; 429/524; 429/526; 429/527
(58) Field of Classification Search .................. None
  See application file for complete search history.

(56) References Cited

U.S. PATENT DOCUMENTS

| | | | |
|---|---|---|---|
| 4,293,396 A | 10/1981 | Allen et al. | |
| 5,879,827 A | 3/1999 | Debe et al. | |
| 5,910,378 A * | 6/1999 | Debe et al. | 429/42 |
| 6,368,476 B1 | 4/2002 | DeMarinis et al. | |
| 6,444,347 B1 | 9/2002 | Ouvry et al. | |
| 6,589,682 B1 | 7/2003 | Fleckner et al. | |
| 6,686,308 B2 | 2/2004 | Mao et al. | |
| 6,869,721 B2 | 3/2005 | Imazato | |
| 7,351,444 B2 | 4/2008 | Wang et al. | |
| 2002/0061433 A1 | 5/2002 | Kawamura et al. | |
| 2002/0127170 A1 | 9/2002 | Hong et al. | |
| 2002/0146615 A1 | 10/2002 | Yamaura | |
| 2002/0175073 A1 * | 11/2002 | Nakamura et al. | 204/294 |
| 2002/0177032 A1 | 11/2002 | Suenaga et al. | |
| 2003/0086859 A1 * | 5/2003 | Kawakami et al. | 423/447.1 |
| 2004/0053111 A1 | 3/2004 | Matsumoto | |

(Continued)

FOREIGN PATENT DOCUMENTS

CN    1278747 A    1/2001

(Continued)

OTHER PUBLICATIONS

Patent Abstracts of Japan, Publication No. 2004-152489; Publication Date May 27, 2004; in the name of Shimakawa et al.

(Continued)

*Primary Examiner* — Barbara L. Gilliam
*Assistant Examiner* — Angela J. Martin
(74) *Attorney, Agent, or Firm* — Christie, Parker & Hale, LLP

(57) ABSTRACT

The present invention relates to an electrode for a fuel cell which includes an electrode substrate composed of nano-carbon fiber, with a catalyst layer formed on the electrode substrate. The electrode substrate has a better strength than an electrode substrate composed of a conventional carbonaceous material, and a pore size which can be controlled even though the composition for forming the catalyst layer may be coated in the form of a slurry.

20 Claims, 1 Drawing Sheet

U.S. PATENT DOCUMENTS

| | | | |
|---|---|---|---|
| 2004/0076870 | A1 | 4/2004 | Tanaka et al. |
| 2004/0076871 | A1 | 4/2004 | Gascoyne et al. |
| 2004/0191602 | A1 | 9/2004 | Ishikawa et al. |
| 2004/0197638 | A1* | 10/2004 | McElrath et al. ............... 429/44 |
| 2004/0234841 | A1 | 11/2004 | Yoshitake et al. |
| 2005/0287418 | A1* | 12/2005 | Noh et al. ....................... 429/40 |
| 2006/0115712 | A1 | 6/2006 | Kim et al. |
| 2006/0172179 | A1 | 8/2006 | Gu et al. |

FOREIGN PATENT DOCUMENTS

| | | |
|---|---|---|
| CN | 1303525 | 7/2001 |
| CN | 1498435 | 5/2004 |
| CN | 1523698 A | 8/2004 |
| CN | 1630676 A | 6/2005 |
| EP | 1 336 998 A1 | 8/2003 |
| EP | 1 383 186 A1 | 1/2004 |
| JP | 62-232860 | 10/1987 |
| JP | 08-017440 | 1/1996 |
| JP | 2000-260435 | 9/2000 |
| JP | 2001-216973 | 8/2001 |
| JP | 2002-110181 | 4/2002 |
| JP | 2002-298861 | 10/2002 |
| JP | 2002-534773 | 10/2002 |
| JP | 2003-115302 | 4/2003 |
| JP | 2003-200052 | 7/2003 |
| JP | 2004-036038 | 2/2004 |
| JP | 2004-059428 | 2/2004 |
| JP | 2004-103592 | 4/2004 |
| JP | 2004-152489 | 5/2004 |
| JP | 2004-288489 | 10/2004 |
| JP | 2004-311276 | 11/2004 |
| JP | 2004-362875 | 12/2004 |
| JP | 2005-100748 | 4/2005 |
| JP | 2002-298861 * | 10/2009 |
| KR | 1993-0020757 | 10/1993 |
| KR | 95-28209 | 10/1995 |
| KR | 2003-0038771 A | 5/2003 |
| KR | 2003-0095694 | 12/2003 |
| KR | 1020040011181 A * | 2/2004 |
| KR | 10-2004-0051287 | 6/2004 |
| WO | WO 99/33132 | 7/1999 |
| WO | WO 01/80334 A2 | 10/2001 |
| WO | WO 02/17427 A1 | 2/2002 |
| WO | WO 02/27828 A1 | 4/2002 |
| WO | WO 02/27830 A1 | 4/2002 |
| WO | WO 02/41432 A1 | 5/2002 |
| WO | WO 02/073722 A1 | 9/2002 |
| WO | WO 02/075831 A1 | 9/2002 |
| WO | WO 03/083128 A2 | 10/2003 |
| WO | WO 2005/044723 A | 5/2005 |

OTHER PUBLICATIONS

Che, Guangli et al.; *Metal-Nanocluster-Filled Carbon Nanotubes: Catalytic Properties and Possible Applications in Electrochemical Energy Storage and Production*; Langmuir 1999, vol. 15, pp. 750-758; XP-000964916.

B. Rajesh et al., Pt-$WO_3$ *Supported on Carbon Nanotubes as Possible Anodes for Direct Methanol Fuel Cells*, Fuel, vol. 81, (2002); pp. 2177-2190.

Tang, Hao et al., *Deposition and electrocatalytic properties of platinum on well-aligned carbon nanotube (CNT) arrays for methanol oxidation*; Materials Chemistry and Physics 92 (2005) pp. 548-553.

European Search Report, dated Mar. 6, 2006, for EP Application No. 05111129.2 in the name of Samsung SDI Co., Ltd.

European Search Report, dated Apr. 24, 2006, for Application No. 05111288.6 in the name of Samsung SDI Co., Ltd.

Extended European Search Report for corresponding application EP 06118097.2-2119; dated Oct. 6, 2006.

U.S. Office action dated Jan. 22, 2009, for related U.S. Appl. No. 11/126,483.

Patent Abstracts of Japan, Publication No. 2004-103592, dated Apr. 3, 2004, in the name of Shuichi Suzuki et al.

U.S. Office action dated May 14, 2009, for related U.S. Appl. No. 11/289,134.

Patent Abstracts of Japan, Publication No. 62-232860, dated Oct. 13, 2007, in the name of Choichi Furuya et al.

Japanese Office action dated Oct. 27, 2009, for corresponding Japanese application 2005-183925.

Japanese Office action dated Oct. 27, 2009, for Japanese application 2005-340578.

U.S. Office action dated Sep. 29, 2009, for related U.S. Appl. No. 11/494,851.

U.S. Office action dated Nov. 10, 2009, for related U.S. Appl. No. 11/126,483.

Japanese Office action dated Apr. 20, 2010, for corresponding Japanese Patent application 2006-208240.

U.S. Office action dated Mar. 19, 2010, for related U.S. Appl. No. 11/494,851.

U.S. Office action dated Mar. 24, 2010, for related U.S. Appl. No. 11/289,134.

U.S. Office action dated Apr. 28, 2010, for related U.S. Appl. No. 11/126,483.

U.S. Office action dated Aug. 4, 2010, for related U.S. Appl. No. 11/126,483.

U.S. Office action dated Aug. 18, 2010, for related U.S. Appl. No. 11/494,851.

U.S. Office action dated Sep. 1, 2010, for related U.S. Appl. No. 11/289,134.

U.S. Office action dated Feb. 2, 2011, for cross reference U.S. Appl. No. 11/494,851, 7 pages.

U.S. Office action dated Jan. 19, 2011, for cross reference U.S. Appl. No. 11/126,483, 11 pages.

U.S. Office action dated Feb. 16, 2011, for cross reference U.S. Appl. No. 11/289,134, 10 pages.

Patent Abstracts of Japan and English machine translation for JP 2001-216973.

Japanese Patent Office Action dated Nov. 2, 2010, issued in corresponding Japanese application No. JP 2005-261157.

* cited by examiner

ELECTRODE FOR A FUEL CELL, AND A MEMBRANE-ELECTRODE ASSEMBLY AND FUEL CELL SYSTEM COMPRISING THE SAME

CROSS REFERENCE TO RELATED APPLICATION

This application claims priority to and the benefit of Korean Patent Application No. 10-2004-0071669 filed in the Korean Intellectual Property Office on Sep. 8, 2004, the entire content of which is incorporated hereinto by reference.

FIELD OF THE INVENTION

The present invention relates to an electrode for a fuel cell, a membrane-electrode assembly for a fuel cell, and a fuel cell system comprising the same.

BACKGROUND OF THE INVENTION

An electrode for a fuel cell is equipped with a gas diffusion layer (GDL) and a catalyst layer. The gas diffusion layer generally uses a porous material to smoothly supply the catalyst later with fuel or oxidant. Exemplary of the commonly used porous materials include carbon paper, carbon cloth, and carbon felt.

However, these materials have the disadvantage of breaking easily due to their low strength and are generally unable to endure the pressure added during the hot-pressing process necessarily required to fabricate a fuel cell. In addition, they tend to lower the output voltage of a fuel cell because they cannot maintain appropriate humidity of a membrane-electrode assembly due to the low hygroscopic capability. Accordingly, a method to improve these disadvantages has been attempted by setting separate humidifying equipment into a cell to maintain a predetermined hygroscopicity, but this method tends to raise the manufacturing cost and further complicates the fabrication procedures.

Another recent attempt has involved arranging a microporous layer (MPL) on the interface of the gas diffusion layer (GDL) adjoining the catalyst layer to maintain a predetermined hygroscopicity, but that approach has also failed to overcome the above disadvantages, while complicating fabrication procedures and raising the manufacturing cost.

SUMMARY OF THE INVENTION

In order to solve the aforementioned problem, in one embodiment of the present invention, an electrode for a fuel cell is provided that is equipped with an electrode substrate being better capable of easily regulating hygroscopicity.

According to another embodiment of the present invention, an electrode for a fuel cell is provided that is fabricated with cloth or felt including nano-carbon fiber.

According to still other embodiments of the present invention, a membrane-electrode assembly for a fuel cell is provided that is equipped with an electrode substrate which includes the above nano-carbon fiber, and a fuel cell system containing the same.

According to an embodiment of the present invention, an electrode for a fuel cell is provided which includes an electrode substrate composed of nano-carbon fiber with a catalyst layer formed on the electrode substrate.

In still another embodiment of the present invention a membrane-electrode assembly for a fuel is provided cell including a polymer electrolyte membrane and an electrode positioned on each side of the polymer electrolyte membrane. The electrode includes an electrode substrate composed of nano-carbon fiber and a catalyst layer formed on the electrode substrate.

According to an embodiment of the present invention, a fuel cell system is provided including: a) an electricity generation unit having: i) a membrane-electrode assembly which includes a polymer electrolyte membrane and an electrode positioned on each side of the polymer electrolyte membrane, and ii) a separator (also referred to as a bipolar plate) arranged on each side of the membrane-electrode assembly; b) a fuel supply unit; and c) an oxidant supply unit.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawing.

DETAILED DESCRIPTION OF THE INVENTION

Figure 1:
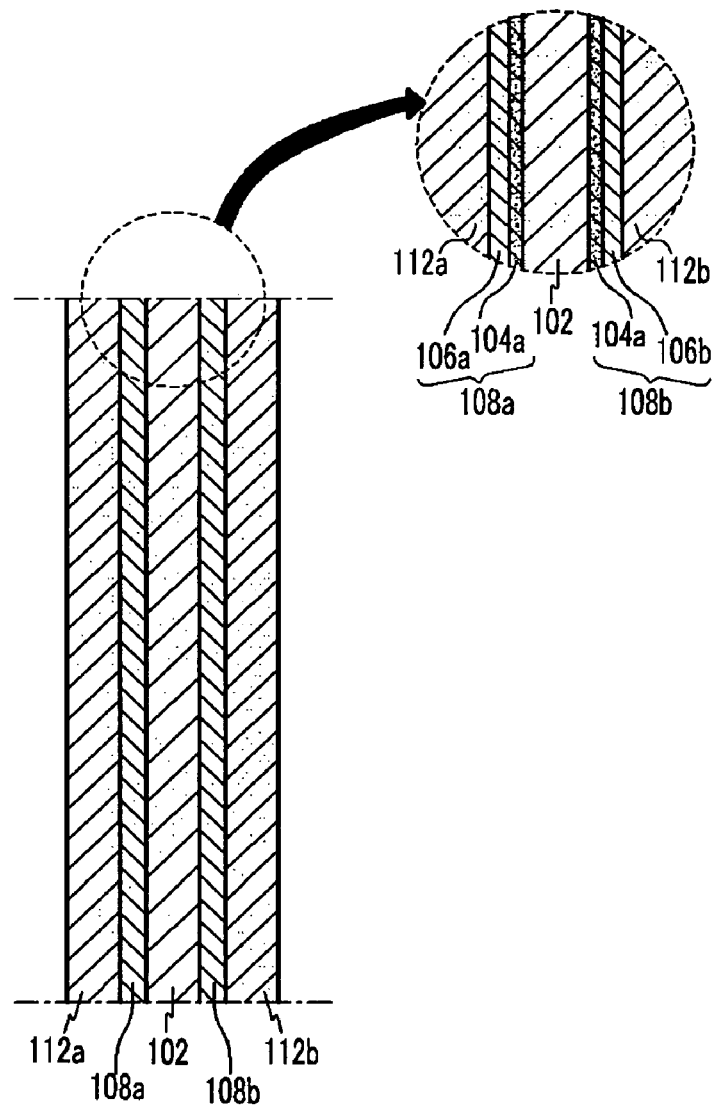
FIG. 1 is a schematic view of a stack for a fuel cell.

In the following detailed description, certain embodiments of the invention have been shown and described to illustrate various modes contemplated by the inventors for carrying out the invention. As will be realized, the invention is capable of modification in various respects, all without departing from the invention. Accordingly, the drawings and description are to be regarded as illustrative in nature, and not restrictive.

An electrode substrate described in the specification diffuses gas as well as supports a catalyst layer, and accordingly is referred to as a catalyst supporting layer or a gas diffusion layer (GDL).

An electrode for a fuel cell includes a catalyst layer and an electrode substrate supporting it and functions in various ways. It is located between a polymer electrolyte membrane and a separator.

First, an electrode substrate functions as a diffuser to uniformly supply reaction gas such as fuel gas, air, or an oxidizing gas such as oxygen with a catalyst inside of the catalyst layer from a gas flow channel of the separator. In addition, it eliminates water generated during the reaction in the catalyst layer through the gas flow channel, and also conducts electrons generated during the reaction as required.

Therefore, the present invention uses an electrode substrate woven into cloth or felt from nano-carbon fiber to improve its reaction gas permeability, water permeability, and electron conductivity.

Nano-carbon fiber has various advantages as a material of an electrode substrate due to its great strength as well as excellent electric conductivity and high specific surface area.

First, it can endure high pressure applied in the hot pressing process during fabrication without breaking easily due to its greater strength than carbon cloth or carbon paper.

It also can accomplish the same or higher cell efficiency than conventional carbon cloth and the like due to much a higher specific surface area in spite of its using a small amount of catalyst.

The aforementioned electrode substrate can be easily fabricated of nano-carbon fiber into fabric or non-fabric, and also cloth or felt. Furthermore, its thickness and porosity can be regulated, depending on the weaving methods. The thickness of the aforementioned cloth or felt type of electrode substrate is in the range of 10 to 1000 µm with a pore size in the range of 0.1 nm to 300 µn. Here, dense weaving with minute pores of down to 0.1 nm is made possible by the nano-carbon fiber. However, when the pore size is more than 300 µm, ion conductivity of the membrane may be reduced.

A micro-porous layer (MPL) can be added between the aforementioned electrode substrate and catalyst layer to increase gas diffusion effects. It uniformly supplies gas into the catalyst layer and transmits electrons thereon into a porous polymer layer. It is formed by coating a composition comprising conductive powder, binder resin, and solvent on the conductive substrate. In general, the conductive powder with small diameter particles can include carbon powder, carbon black, acetylene black, activated carbon, or nano-carbon such as carbon nano tube, carbon nano fiber, carbon nano wire, carbon nano horn, carbon nano ring, and the like. Suitable examples of the binder resin include polytetrafluoroethylene (PTFE), polyvinylidene fluoride, copolymers of polyvinylidenefluoride-hexafluoropropylene (PVDF-HFP), polyvinylalcohol, cellulose acetate, and similar polymers.

Suitable solvents include alcohols such as ethanol, isopropyl alcohol, ethyl alcohol, n-propyl alcohol, and butyl alcohol, water, dimethylacetamide, dimethylformamide, demethylsulfoxide (DMSO), N-methylpyrrolidone, and tetrahydrofuran.

The coating method may include, but is not limited to, screen printing, spray coating, doctor blade methods, gravure coating, dip coating, silk screening, painting, and so on, depending on the viscosity of the composition.

The aforementioned nano-carbon fiber in the present invention has no particular limits in size, but a smaller diameter is generally desired. Nonetheless, a carbon fiber with a diameter under 1 nm is difficult to fabricate, and according to one embodiment, the diameter is in the range of 1 to 500 nm with a length in the range of 50 to 5000 nm. When the diameter is greater than 500 nm, an amount of the catalyst coated on the electrode substrate decreases resulting in a reduction of power.

A cloth or felt type of electrode substrate is fabricated by using the aforementioned nano-carbon fiber by a common method in the related field.

The electrode substrate of the present invention is fabricated into cloth or felt by using nano-carbon fiber. The cloth or felt can be fabricated to have nano-sized pores. By regulating the pore size, the aforementioned electrode substrate can easily eliminate water generated at the entrance of the gas flow channel of a separator and delay the flow of the eliminated water at the exit, uniformly maintaining a predetermined hygroscopicity level of a polymer electrolyte membrane as well as raising the water permeability of the electrode substrate.

In addition, cloth or felt made of the aforementioned nano-carbon fiber is advantageously in the range of 10 to 1000 µm thick to be used for an electrode substrate. When the thickness is under 10 µm, the electrode substrate cannot play a role of a supporter while when it is over 1000 µm, the smooth supply of fuel gas or oxidizing gas is inhibited.

Furthermore, the aforementioned electrode substrate can be coated by a water-repellent polymer. The water-repellent polymer may include commonly-used fluorine group polymers, for example, polyvinylidenefluoride, polytetrafluoroethylene, fluorinated ethylenepropylene, and polychlorotrifluoroethylene.

According to an embodiment of the present invention, an electrode substrate with a catalyst layer on one side can be applied to an anode or a cathode for a fuel cell.

A metal catalyst material used in the present invention can be selected from, but is not limit to, the group consisting of platinum, ruthenium, osmium, platinum-ruthenium alloys, platinum-osmium alloys, platinum-palladium alloys, and platinum-M alloys where M is at least one metal selected from the group consisting of Ga, Ti, V, Cr, Mn, Fe, Co, Ni, Cu, and Zn. Preferred catalysts include those selected from the group consisting of platinum, ruthenium, osmium, platinum-ruthenium alloys, platinum-osmium alloys, platinum-palladium alloys, platinum-cobalt alloys, and platinum-nickel alloys.

Further, the catalyst is generally supported by a carrier. The carrier may include carbon such as acetylene black or graphite, or an inorganic particulate such as alumina, silica, zirconia, or titania. When the catalyst is a noble metal supported on a carrier, it may include any one of commercially available products that already includes the catalyst on a carrier, or may be prepared by supporting the noble metal on a carrier. Since the process for supporting a noble metal on a carrier is known to the art, it is omitted from this description.

The aforementioned metal catalyst material may be wet-coated in the form of a slurry or directly dry-deposited on an electrode substrate to form a catalyst layer in a predetermined thickness.

The aforementioned wet-coating is a simple procedure, wherein a metal catalyst material in a solution is coated on a porous electrode substrate, and such a procedure increases output of a fuel cell by increasing surface contact between the formed catalyst layer and the polymer electrolyte membrane.

Suitable wet-coating methods include common screen printing, spray coating, or doctor blade techniques, depending on the viscosity of a composition, but the method is not limited to such techniques.

A dry-deposition method may also be used and has an advantage of using a smaller amount of a catalyst than wet-coating. However, the output of a fuel cell becomes lower as the surface area of a catalyst decreases because the surface area of a catalyst is determined in proportion to the specific surface area of an electrode substrate deposited with a catalyst.

However, output of a fuel cell with an electrode substrate made of cloth or felt fabricated with nano-carbon does not decrease due to its maximized specific surface area in spite of a small amount of a catalyst. The aforementioned dry-deposition method may be selected from the group consisting of sputtering, chemical vapor deposition (CVD), physical vapor deposition (PVD), or plasma-enhanced chemical vapor deposition (PECVD).

An electrode substrate fabricated according to the present invention is provided with the anode and cathode, a polymer electrolyte membrane is interposed therebetween to fabricate a membrane-electrolyte assembly, and then separators are provided at both ends thereof, which can advantageously be applied to the electricity generation unit of a fuel cell system.

That is to say, the present invention provides a fuel cell system which includes: i) an electricity generation unit which includes a membrane-electrode assembly including a pair of electrodes equipped with the aforementioned gas diffusion layers and catalyst layers, and a polymer electrolyte membrane interposed therebetween, ii) a separator equipped with inlet and outlet channels, located at both sides of the membrane-electrode assembly; a fuel supply unit; and an oxidant supply unit.

FIG. 1 is a simple schematic drawing of a stack for a fuel cell equipped with an electrode substrate according to the present invention.

Referred to FIG. 1, a stack 100 for a fuel cell has a structure wherein a membrane-electrode assembly comprises an anode and a cathode 108a and 108b facing each other with a polymer electrolyte membrane 102 interposed therebetween, and laminated with separators 112a and 112b respectively at both sides thereof. The aforementioned anode and cathode 108a and 108b are respectively equipped with catalyst layers 104a and 104b and electrode substrates 106a and 106b.

The polymer electrolyte membrane includes a proton-conductive polymer. The proton-conducting polymer may be selected from the group consisting of perfluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyether-etherketone-based polymers, and polyphenylquinoxaline-based polymers. In a preferred embodiment, at least one proton-conducting polymer may include but is not limited to a polymer selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, aryl ketones, poly(2,2'-(m-phenylene)-5,5'-bibenzimidazole), and poly(2,5-benzimidazole). However, according to the present invention, a proton-conducting polymer included in a polymer electrolyte membrane for a fuel cell is not limited to these polymers.

A method of fabricating this fuel cell is comprehensively illustrated as follows.

First, electrode substrates 106a and 106b are prepared in the shape of cloth or felt fabricated with nano-carbon fiber.

Next, an anode and a cathode 108a and 108b are fabricated by forming catalyst layers 104a and 104b through coating a metal catalyst material on one side of each electrode substrate 106a and 106b by a wet coating or a dry deposition method. Then, the substrates applied with catalyst layers 104a and 104b on the aforementioned electrode substrates 106a and 106b are passed through a rolling machine two to five times, increasing the adherence between catalyst layers 108a and 108b and electrode substrates 106a and 106b.

Then, a membrane-electrode assembly is fabricated by inserting a polymer electrolyte membrane 102 between the aforementioned anode and cathode 108a and 108b and hot-pressing them at a temperature of 100 to 140° C. with a load of 50 to 150 kgf/cm$^2$.

Then, a unit cell 100 composed of a stack for a fuel cell is fabricated by locating separators 112a and 112b at both sides of the aforementioned membrane-electrode assembly. Finally, a fuel cell is fabricated by stacking and electrically connecting at least two unit cells for a fuel cell, but more typically, tens thereof.

End plates are located outside of the stack, are linked to one another with a connecting member, and are fixed together with pressure in order to decrease electric resistance among parts such as a separator comprising the stack for a fuel cell when they contact one another and to maintain air-tightness of fuel gas or oxidizing gas.

A cloth or felt made of a conventional carbonaceous material has a disadvantage of easily breaking due to its low strength during the many pressurization processes necessarily required to fabricate a fuel cell. However, this problem is solved by using an electrode substrate composed of nano-carbon fiber with high strength according to the present invention. In particular, the present invention can produce a fuel cell without the need for a humidifier because it can uniformly maintain the desired degree of moisture in a polymer electrolyte membrane by increasing water permeability by means of controlling the pore sizes of an electrolyte substrate.

The following examples illustrate the present invention in further detail. However, it is understood that the present invention is not limited thereto.

Example 1

A slurry was prepared by mixing 20 parts by weight of Pt/C powder (Pt content of 20 wt %) and 13.4 parts by weights of Nafion™ in 66.6 parts by weight of a solvent mix of water and isopropyl alcohol (with a volume ratio of 4:1), treating the mixture with ultrasound for 30 minutes, and stirring it for 3 hours with a magnetic agitator.

The above slurry was coated on an electrode substrate composed of nano-carbon fiber with a pore diameter of 100 nm and dried to fabricate an anode and a cathode with a 60 μm-thick catalyst layer.

The above anode and cathode were stacked on both sides of Nafion112™ films and hot-pressed therewith together at a temperature of 120° C. for 3 minutes to fabricate a membrane-electrode assembly. Then, a unit cell was fabricated by connecting separators on both sides of the membrane-electrode assembly.

Example 2

Another unit cell was fabricated by the same procedure as Example 1 except for using platinum to form a 30 μm-thick catalyst layer by a sputtering method.

Comparative Example 1

A unit cell was fabricated by the same procedure as Example 1 except for using carbon cloth with 100 μm-sized pores as an electrode substrate.

Comparative Example 2

A unit cell was fabricated by the same procedure as Example 2 except for using carbon cloth with 200 Sun-sized pores as an electrode substrate.

Experimental Example 1

Humidified hydrogen and air were injected into the unit cells fabricated in the above Examples and Comparative Examples at a temperature of 70° C. and at a normal pressure and the voltages were measured. The results are given in the following Table 1.

TABLE 1

| Current Density (A/cm$^2$) | Voltage (V) | | | |
|---|---|---|---|---|
| | Example 1 | Example 2 | Comparative Example 1 | Comparative Example 2 |
| 0 | 0.94 | 0.93 | 0.92 | 0.91 |
| 0.2 | 0.91 | 0.87 | 0.83 | 0.82 |
| 0.6 | 0.68 | 0.62 | 0.53 | 0.51 |
| 0.8 | 0.53 | 0.51 | 0.47 | 0.42 |
| 1 | 0.47 | 0.44 | 0.36 | 0.31 |

As shown in the above Table 1, outputs of the unit cells fabricated according to Examples 1 and 2 of the present invention proved to be much better than those of Comparative Examples 1 and 2 fabricated by using conventional carbon cloth.

The above fuel cell has a higher efficiency in that it has excellent gas and water permeability, outstanding electron conductivity, and a low defect rate of products because it can endure the hot-rolling process due to an electrode substrate comprising nano-carbon fiber.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrode for a fuel cell, comprising:
   an electrode substrate composed of nano-carbon fiber, the electrode substrate having a pore size ranging from 0.1 nm to 300 µm; and
   a catalyst layer formed on the electrode substrate.

2. The electrode of claim 1, wherein the nano-carbon fiber has a diameter ranging from 1 to 500 nm.

3. The electrode of claim 1, wherein the electrode substrate has a thickness in the range of 10 to 1000 µm.

4. The electrode of claim 1, wherein the electrode substrate comprises cloth or felt.

5. The electrode of claim 1, wherein the catalyst layer comprises a catalyst selected from the group consisting of platinum, ruthenium, osmium, platinum-ruthenium alloys, platinum-osmium alloys, platinum-palladium alloys, platinum-M alloys where M is at least one metal selected from the group consisting of Ga, Ti, V, Cr, Mn, Fe, Co, Ni, Cu, and Zn, and combinations thereof.

6. The electrode of claim 1, further comprising a microporous layer between the catalyst layer and the electrode substrate.

7. A membrane-electrode assembly for a fuel cell, comprising
   a polymer electrolyte membrane and an electrode positioned on each side of the polymer electrolyte membrane, each electrode comprising an electrode substrate comprising nano-carbon fiber with a catalyst layer thereon, the electrode substrate having a pore size ranging from 0.1 nm to 300 µm.

8. The membrane-electrode assembly of claim 7, wherein the nano-carbon fiber has a diameter ranging from 1 to 500 nm.

9. The membrane-electrode assembly of claim 7, wherein the electrode substrate has a thickness in the range of 10 to 1000 µm.

10. The membrane-electrode assembly of claim 7, wherein the electrode substrate comprises cloth or felt.

11. The membrane-electrode assembly of claim 7, wherein the catalyst layer comprises a catalyst selected from the group consisting of platinum, ruthenium, osmium, platinum-ruthenium alloys, platinum-osmium alloys, platinum-palladium alloys, platinum-M alloys where M is at least one metal selected from the group consisting of Ga, Ti, V, Cr, Mn, Fe, Co, Ni, Cu, and Zn, and combinations thereof.

12. The membrane-electrode assembly of claim 7, further comprising a micro-porous layer between the catalyst layer and the electrode substrate.

13. A fuel cell system comprising:
   an electricity generation unit comprising:
      a membrane-electrode assembly which includes a polymer electrolyte membrane and an electrode positioned on each side of the polymer electrolyte membrane, wherein at least one electrode comprises an electrode substrate comprising nano-carbon fiber with a catalyst layer thereon, the electrode substrate having a pore size ranging from 0.1 nm to 300 µm; and
      a separator arranged on each side of the membrane-electrode assembly;
   a fuel supply unit; and
   an oxidant supply unit.

14. The fuel cell system of claim 13, wherein the nano-carbon fiber has a diameter ranging from 1 to 500 nm.

15. The fuel cell system of claim 13, wherein the electrode substrate has a thickness in the range of 10 to 1000 µm.

16. The fuel cell system of claim 13, wherein the electrode substrate comprises cloth or felt.

17. The fuel cell system of claim 13, wherein the catalyst layer comprises a catalyst selected from the group consisting of platinum, ruthenium, osmium, platinum-ruthenium alloys, platinum-osmium alloys, platinum-palladium alloys, platinum-M alloys where M is at least one metal selected from the group consisting of Ga, Ti, V, Cr, Mn, Fe, Co, Ni, Cu, and Zn, and combinations thereof.

18. The fuel cell system of claim 13, wherein the polymer electrolyte membrane comprises a proton-conducting polymer selected from the group consisting of perfluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyether-etherketone-based polymers, polyphenylquinoxaline-based polymers, and combinations thereof.

19. The fuel cell system of claim 13, wherein the polymer electrolyte membrane comprises a proton-conducting polymer selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, aryl ketones, poly(2,2'-(m-phenylene)-5,5'-bibenzimidazole), poly(2,5-benzimidazole), and combinations thereof.

20. The electrode of claim 1, wherein the nano-carbon fiber is woven into cloth or felt.

* * * * *